United States Patent
Foletto et al.

(10) Patent No.: US 11,385,075 B2
(45) Date of Patent: Jul. 12, 2022

(54) ORIENTATION INDEPENDENT MAGNETIC FIELD SENSOR

(71) Applicant: Allegro MicroSystems, LLC, Manchester, NH (US)

(72) Inventors: Andrea Foletto, Andorno Micca (IT); Yannick Vuillermet, Voglans (FR); Florian Kulla, Annecy (FR)

(73) Assignee: Allegro MicroSystems, LLC, Manchester, NH (US)

( * ) Notice: Subject to any disclaimer, the term of this patent is extended or adjusted under 35 U.S.C. 154(b) by 279 days.

(21) Appl. No.: 16/797,289

(22) Filed: Feb. 21, 2020

(65) Prior Publication Data
US 2021/0262831 A1   Aug. 26, 2021

(51) Int. Cl.
| G01D 5/14 | (2006.01) |
| G01D 5/16 | (2006.01) |
| G01P 3/44 | (2006.01) |

(52) U.S. Cl.
CPC .............. *G01D 5/145* (2013.01); *G01D 5/16* (2013.01); *G01P 3/44* (2013.01)

(58) Field of Classification Search
CPC ............. G01D 5/145; G01D 5/16; G01P 3/44
See application file for complete search history.

(56) References Cited

U.S. PATENT DOCUMENTS

| 4,935,698 A | 6/1990 | Kawaji et al. |
| 5,781,005 A | 7/1998 | Vig et al. |
| 5,917,320 A | 6/1999 | Scheller et al. |
| 6,091,239 A | 7/2000 | Vig et al. |
| 6,278,269 B1 | 8/2001 | Vig et al. |
| 6,525,531 B2 | 2/2003 | Forrest et al. |
| 6,692,676 B1 | 2/2004 | Vig et al. |
| 6,693,419 B2 | 2/2004 | Stauth et al. |
| 7,026,808 B2 | 4/2006 | Vig et al. |
| 7,253,614 B2 | 8/2007 | Forrest et al. |
| 7,368,904 B2 | 5/2008 | Scheller et al. |
| 7,772,838 B2 | 8/2010 | Bailey et al. |
| 7,777,607 B2 | 8/2010 | Taylor et al. |
| 8,450,996 B2 | 5/2013 | Foletto et al. |
| 8,624,588 B2 | 1/2014 | Vig et al. |
| 8,729,892 B2 | 5/2014 | Friedrich |
| 8,896,295 B2 | 11/2014 | Friedrich et al. |
| 9,007,054 B2 | 4/2015 | Friedrich et al. |
| 9,046,383 B2 | 6/2015 | Friedrich et al. |
| 9,081,041 B2 | 7/2015 | Friedrich et al. |
| 9,605,975 B2 | 3/2017 | Foletto et al. |

(Continued)

OTHER PUBLICATIONS

International Search Report and Written Opinion for International Application No. PCT/US2021/012254 dated Apr. 15, 2021; 20 Pages.

*Primary Examiner* — Reena Aurora
(74) *Attorney, Agent, or Firm* — Daly, Crowley Mofford & Durkee, LLP

(57) ABSTRACT

Methods and apparatus for an orientation insensitive speed sensor. Magnetic field sensing elements can be located on a circle, for example, to generate first and second channel signals which can be combined to generate an output signal. The location of the magnetic field sensing elements reduces the effects of stray fields. Embodiments can include true power own state processing to determine target position during start up.

37 Claims, 12 Drawing Sheets

(56) References Cited

U.S. PATENT DOCUMENTS

| | | | |
|---|---|---|---|
| 9,810,519 B2 | 11/2017 | Taylor et al. | |
| 9,976,876 B2 | 5/2018 | Metivier et al. | |
| 10,041,810 B2 | 8/2018 | Vig et al. | |
| 10,215,590 B2 | 2/2019 | David et al. | |
| 10,254,103 B2 | 4/2019 | Taylor et al. | |
| 10,385,964 B2 | 8/2019 | Vuillermet et al. | |
| 2012/0249126 A1 | 10/2012 | Friedrich et al. | |
| 2012/0249133 A1 | 10/2012 | Friedrich | |
| 2016/0033586 A1* | 2/2016 | Hakenes | G01R 33/07 324/251 |
| 2017/0356967 A1* | 12/2017 | Romero | G01D 5/145 |
| 2018/0196080 A1 | 7/2018 | Binder | |
| 2018/0224300 A1 | 8/2018 | Vig et al. | |
| 2018/0238713 A1 | 8/2018 | Metivier et al. | |
| 2019/0301893 A1* | 10/2019 | Ruigrok | G01D 5/16 |

* cited by examiner

ORIENTATION INDEPENDENT MAGNETIC FIELD SENSOR

BACKGROUND

Magnetic field sensors that sense motion, such as rotation of a target, such as a gear tooth target, are known. Such sensors detect features of the rotating target's profile, for example, teeth and valleys of a ferrous gear or north and south poles of a magnetic target such as a ring magnet.

The magnetic field associated with the target profile is sensed by a magnetic field sensing element, such as Hall element or magnetoresistive (MR) element. As the target passes the sensing element, the magnetic field experienced by the sensing element varies in relation to the target profile. The sensing element provides a signal proportional to the sensed magnetic field and the sensor processes the magnetic field signal to generate an output, for example, a signal that changes state each time the magnetic field signal crosses a threshold. Such an output can be used to provide rotational speed information.

SUMMARY

Embodiments of the invention provide methods and apparatus for a sensor having multiple magnetic field sensing elements to provide orientation insensitive differential sensing. Example embodiments may be useful in detecting the speed of a rotating target, such an engine camshaft. In embodiments, the sensor can include true power on state (TPOS) information that enables determination of target position during or after start up, for example.

In one aspect, a sensor in an integrated circuit package comprises: at least a first pair of sensing elements comprising first and second magnetic field sensing elements and a second pair of sensing elements comprising third and fourth magnetic field sensing elements for measuring field change in response to movement of a target, wherein each of the magnetic field sensing elements in the first and second pairs of sensing elements is located in a planar circle, wherein each of the magnetic field sensing elements has its most sensitive direction to a magnetic field radial to the planar circle, wherein the first magnetic field sensing element is positioned to be diametrically opposite the second magnetic field sensing element, and wherein the third magnetic field sensing element is positioned to be diametrically opposite the fourth magnetic field sensing element, wherein the first and second magnetic field sensing elements are configured to measure positive field in the same direction and the third and fourth magnetic field sensing elements are configured to measure positive field in the same direction, wherein a plane of the planar circle is configured for positioning to be parallel to a tangent of the target which has teeth and valleys, wherein the sensor is configured to subtract a voltage generated by the second magnetic field sensing element from a voltage generated by the first magnetic field sensing element to provide a first voltage, and wherein the sensor is configured to subtract a voltage generated by the third magnetic field sensing element from a voltage generated by the fourth magnetic field sensing element to generate a second voltage, and wherein the sensor is configured to combine the first and second voltages to generate a third voltage.

A sensor can include one or more of the following features: the first, second, third, and fourth magnetic field sensing elements comprise vertical Hall elements, the first, second, third, and fourth magnetic field sensing elements comprise magnetoresistive elements, combining the first voltage and the second voltage by averaging the first channel signal and the second channel signal, combining the first voltage and the second voltage by summing the first channel signal and the second channel signal, the first, second, third, and fourth magnetic field sensing elements are back-biased by a ring magnet or a block magnet, the first, second, third, and fourth magnetic field sensing elements are back-biased by a 0G magnet, the first, second, third, and fourth magnetic field sensing elements are positioned so that a magnetic field sensed for a maximum distance from the target is less than a magnetic field sensed for a minimum distance from the target, setting a threshold on the third voltage to determine a position of the target during start up, the threshold is between the third voltage corresponding to a tooth of the target proximate the first, second, third, and fourth magnetic field sensing elements and a valley of the target proximate the first, second, third, and fourth magnetic field sensing elements, the first, second, third, and fourth magnetic field sensing elements are equally spaced about the circle, the first, second, third, and fourth magnetic field sensing elements and configured in a bridge, and/or at least two more magnetic field sensing elements in addition to the first, second, third, and fourth magnetic field sensing elements.

In another aspect, a method comprises: employing at least a first pair of sensing elements comprising first and second magnetic field sensing elements and a second pair of sensing elements comprising third and fourth magnetic field sensing elements for measuring field change in response to movement of a target, wherein each of the magnetic field sensing elements in the first and second pairs of sensing elements is located in a planar circle, wherein each of the magnetic field sensing elements has its most sensitive direction to a magnetic field radial to the planar circle, wherein the first magnetic field sensing element is positioned to be diametrically opposite the second magnetic field sensing element, and wherein the third magnetic field sensing element is positioned to be diametrically opposite the fourth magnetic field sensing element, wherein the first and second magnetic field sensing elements are configured to measure positive field in the same direction and the third and fourth magnetic field sensing elements are configured to measure positive field in the same direction, wherein a plane of the planar circle is configured for positioning to be parallel to a tangent of the target which has teeth and valleys; subtracting a voltage generated by the second magnetic field sensing element from a voltage generated by the first magnetic field sensing element to provide a first voltage; subtracting a voltage generated by the third magnetic field sensing element from a voltage generated by the fourth magnetic field sensing element to generate a second voltage; and combining the first and second voltages to generate a third voltage.

A method can further include one or more of the following features: the first, second, third, and fourth magnetic field sensing elements comprise vertical Hall elements, the first, second, third, and fourth magnetic field sensing elements comprise magnetoresistive elements, combining the first voltage and the second voltage by averaging the first channel signal and the second channel signal, combining the first voltage and the second voltage by summing the first channel signal and the second channel signal, the first, second, third, and fourth magnetic field sensing elements are back-biased by a ring magnet or a block magnet, the first, second, third, and fourth magnetic field sensing elements are back-biased by a 0G magnet, the wherein the first, second, third, and fourth magnetic field sensing elements are positioned so that a magnetic field sensed for a maximum distance from the target is less than a magnetic field sensed for a minimum distance from the target, setting a threshold on the third voltage to determine a position of the target during start up, the threshold is between the third voltage corresponding to a tooth of the target proximate the first, second, third, and fourth magnetic field sensing elements and a valley of the target proximate the first, second, third, and fourth magnetic field sensing elements, the first, second, third, and fourth magnetic field sensing elements are equally spaced about the circle, the first, second, third, and fourth magnetic field sensing elements and configured in a bridge, employing at least two more magnetic field sensing elements in addition to the first, second, third, and fourth magnetic field sensing elements.

In a further aspect, a sensor comprises: a means for sensing comprising a plurality of magnetic field sensing elements for measuring field change in response to movement of a target, wherein each of the magnetic field sensing elements is located in a planar circle positioned to be diametrically opposite another of the magnetic field sensing elements, wherein a plane of the planar circle is configured for positioning to be parallel to a tangent of the target which has teeth and valleys; and a means for processing a voltage generated by a second one of the magnetic field sensing element from a voltage generated by a first one of the magnetic field sensing elements to provide a first voltage, subtracting a voltage generated by a third one of the magnetic field sensing elements from a voltage generated by a fourth one of the magnetic field sensing elements to generate a second voltage, and combining the first and second voltages to generate a third voltage.

BRIEF DESCRIPTION OF THE DRAWINGS

The foregoing features of this invention, as well as the invention itself, may be more fully understood from the following description of the drawings in which.

DETAILED DESCRIPTION

Figure 1:
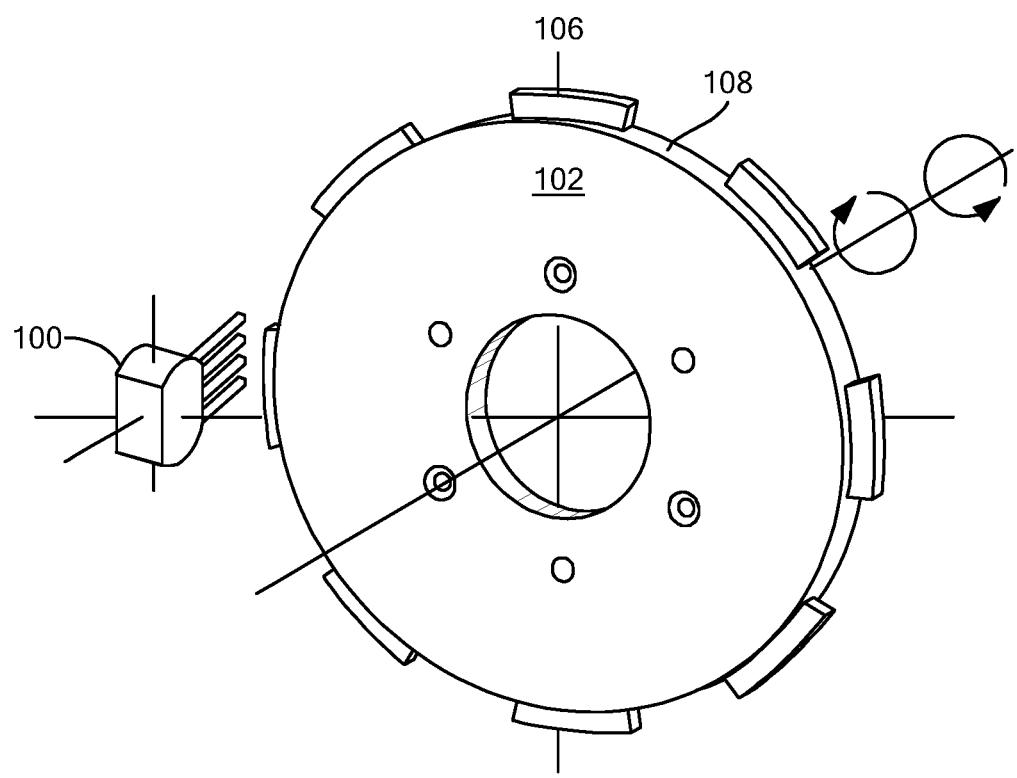
FIG. 1 is a representation of a magnetic field sensor IC in accordance with example embodiments of the invention positioned in relation to a rotating target.

FIG. 1 shows an example sensor integrated circuit (IC) 100 for sensing movement of a rotating target 102 having an uneven outer surface, such as alternating teeth 106 and valleys 108. In example embodiments, the sensor IC 100 is configured to determine rotational speed of an engine cam shaft. As described more fully below, the sensor IC 100 may provide differential sensing and be orientation insensitive. In some embodiments, the sensor IC includes true power on sensing (TPOS) to determine a position of a target at start up, as also described more fully below.

Figure 2:
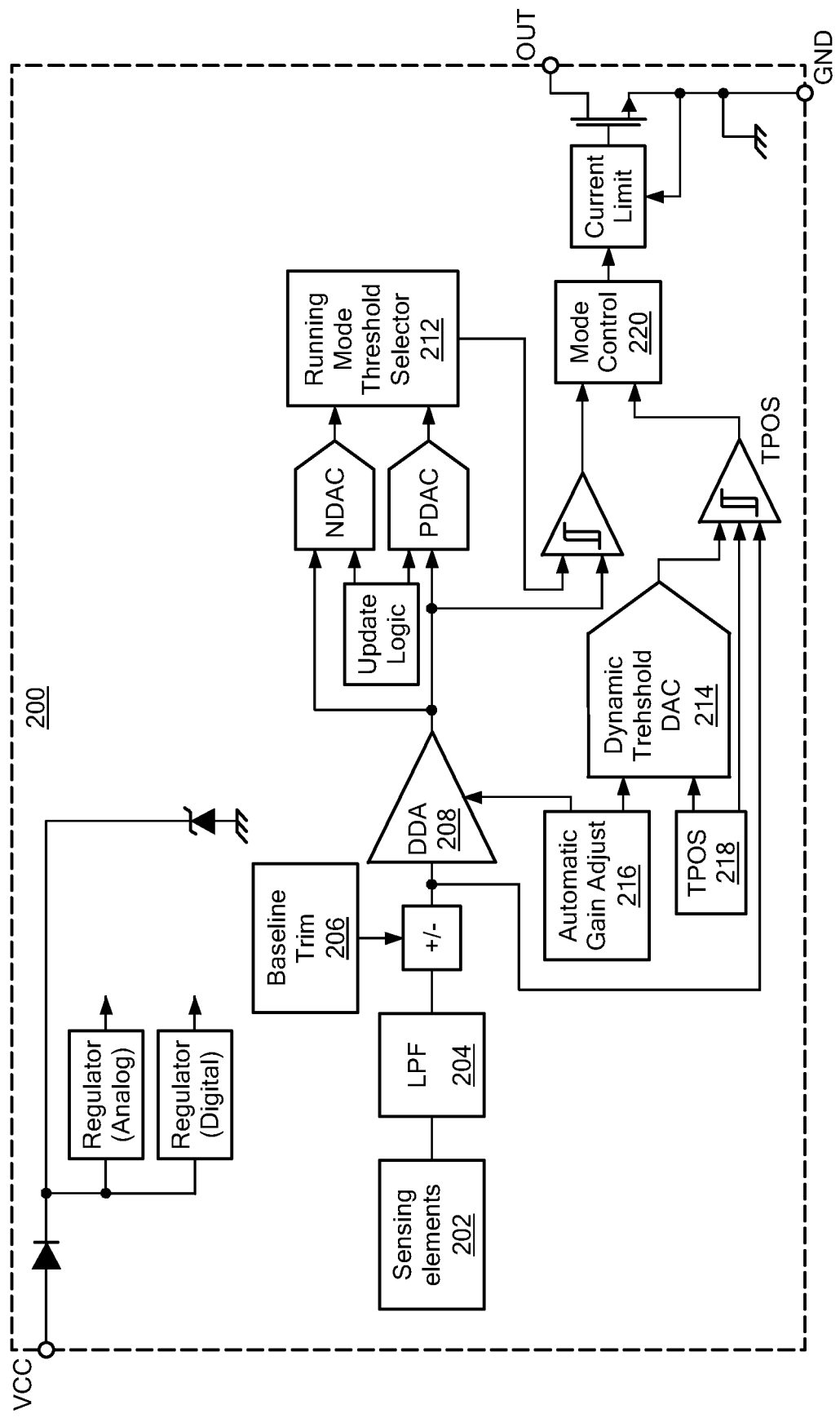
FIG. 2 is a block diagram of an example magnetic field sensor IC in accordance with example embodiments of the invention.

FIG. 2 shows a block diagram of an example speed sensor IC 200 having orientation insensitive differential magnetic field sensing in accordance with example embodiments. A magnetic field sensing element module 202 can include one or more magnetic field sensing elements, such as vertical Hall elements for example. The output of the magnetic field sensing element module 202 can be filtered 204, trimmed 206, and amplified 208, such as by a differential-difference amplifier (DDA). In embodiments, the magnetic field sensing elements, which may be Hall element devices, are chopper stabilized for measuring the intensity of magnetic gradients and providing electrical signals that correspond to target features.

Figure 2A:
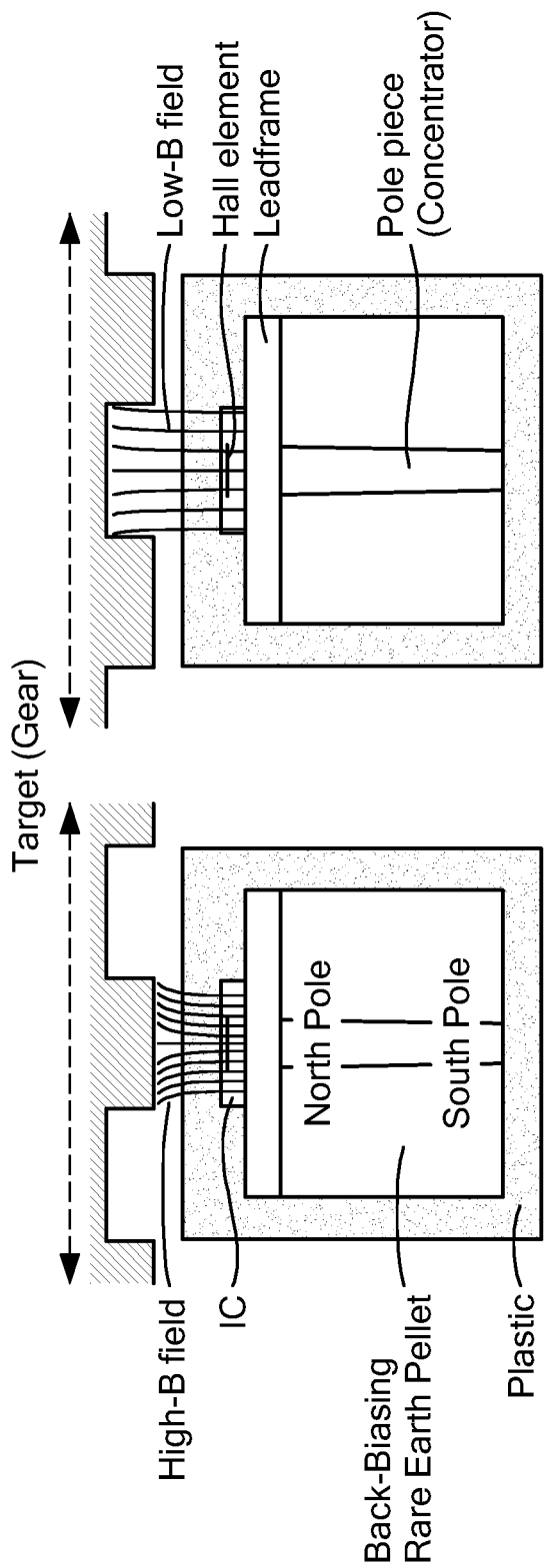
FIG. 2A is a schematic representation of a portion of an example magnetic field sensor IC in accordance with example embodiments of the invention.

FIG. 2A shows an example implementation of the IC 200 of FIG. 2 along with a target in opposite tooth/valley positions. In the illustrated embodiment, the magnetic field sensing element is back-biased with a magnet, such as a pellet, with a concentrator aligned with the magnetic field sensing element. When the tooth is aligned with the magnetic field sensing element, a high-B field is present and when the valley is aligned, a low-B field is present. The difference in the magnetic gradients created by teeth and valleys allows the devices to generate a digital output signal that is representative of the target features.

Referring again to FIG. 2, the IC output signal OUT is a digital representation of the mechanical profile of the target. Automatic Gain Control (AGC) ensures that the switching thresholds are isolated from the effects of changes in the effective air gap (the total distance between the Hall element and the nearest feature of the target). AGC normalizes the sensed magnetic gradient so the internal processed signal falls within the optimum processing range.

In example embodiments, the sensor IC 200 operates in multiple modes, such as: TPOS, calibration, and running, under the control of a running mode processor 212. TPOS and calibration may initialize at power-on. TPOS generates immediate device output by controlling device switching while the calibration functions are performed. After calibration is complete, normal operation in running mode begins.

After a power-on time, the device immediately generates an output voltage corresponding to the target feature opposite the device by comparing the existing level of the application magnetic gradient a TPOS threshold level, an internal threshold used to distinguish a tooth from a valley during TPOS operation (from power-on until the end of the Initial Calibration stage), as described more fully below.

Figure 2B:
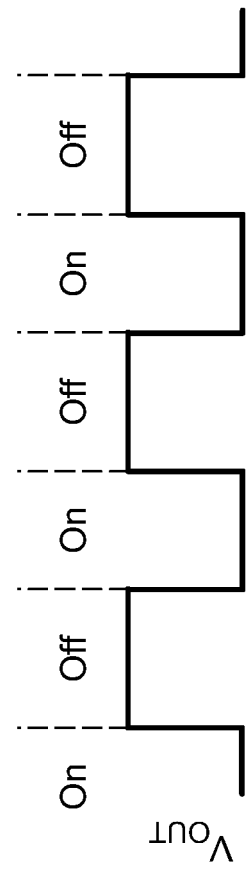
FIG. 2B is a waveform diagram of an example output signal for a magnetic field sensor IC in accordance with example embodiments of the invention.

In embodiments, a digital-to-analog (DAC) 214 can receive AGC 210 and TPOS trim 218 signals to generate thresholds for mode control 220. In operation, a waveform on the output OUT corresponds to peak/valley transitions of the rotating target, as shown in FIG. 2B.

Figure 3A:
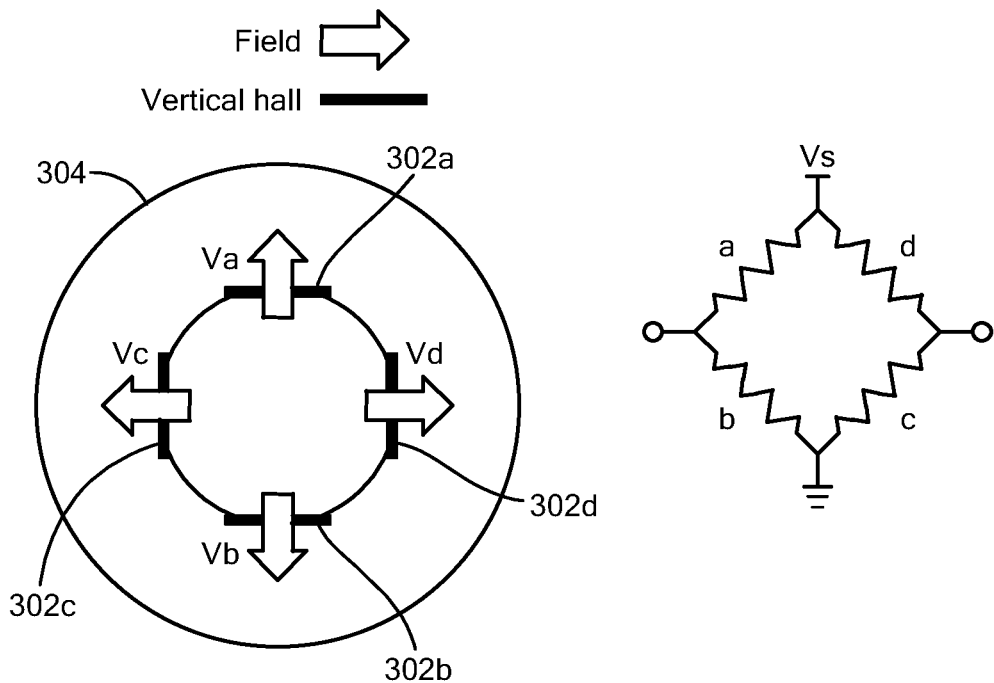
FIGS. 3A-3C show magnetic field sensing elements positioned in relation to a magnet as part of an example magnetic field sensor IC in accordance with example embodiments of the invention.
Figure 3B:
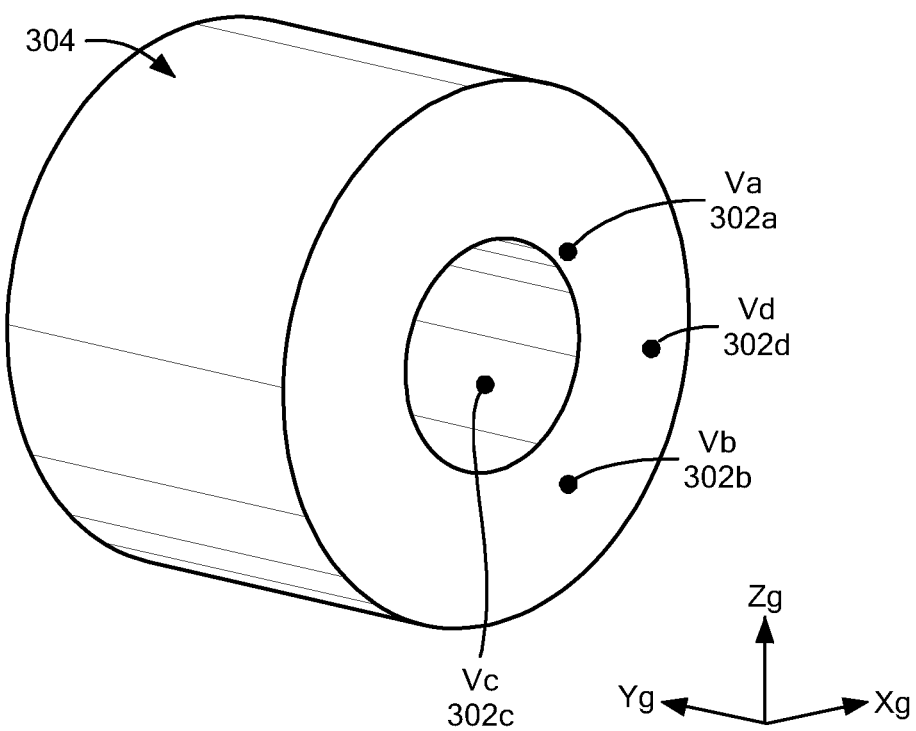
Figure 3C:
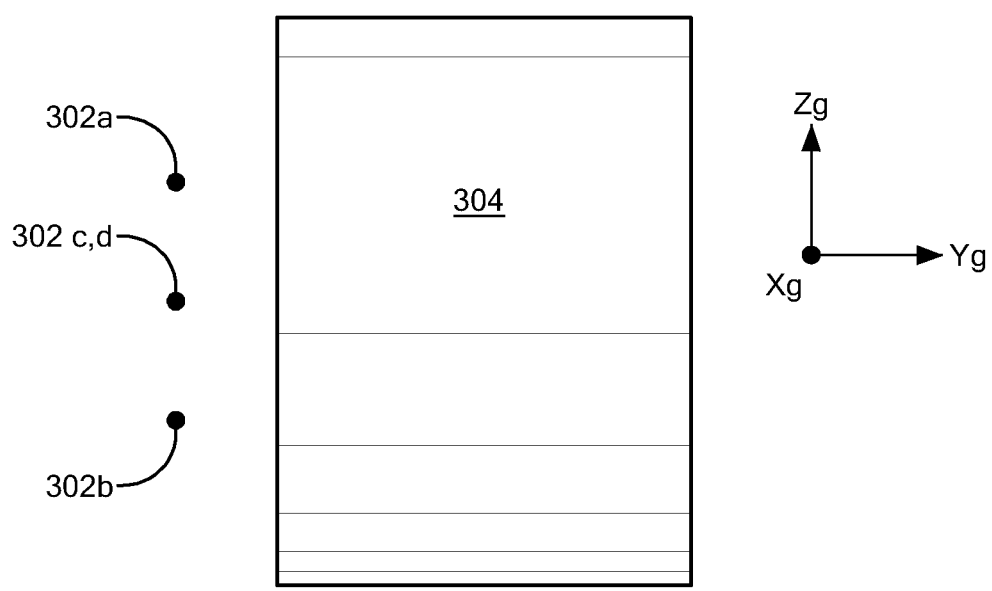
Figure 4:
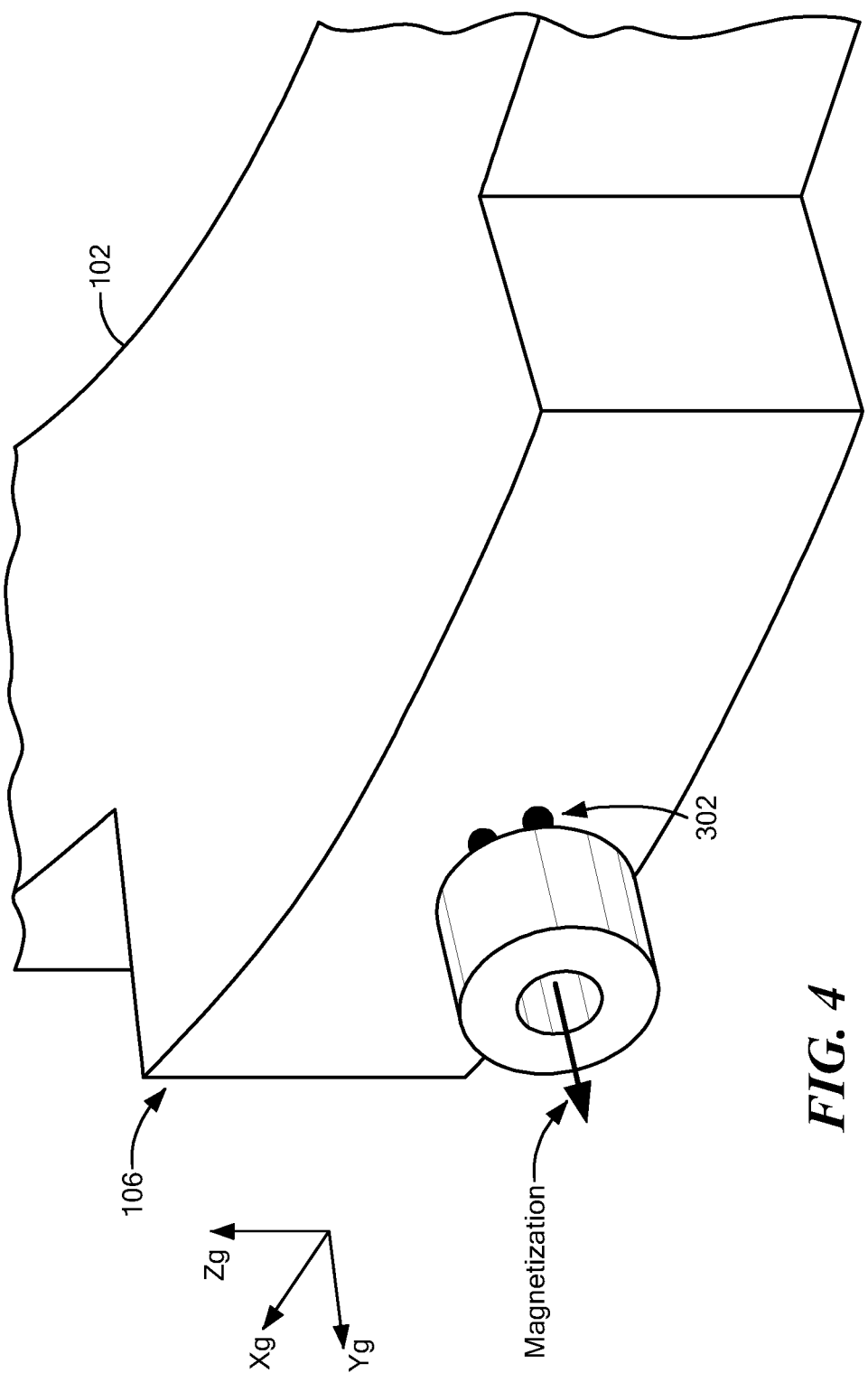
FIG. 4 is a representation of a portion of an example magnetic field sensor IC in accordance with example embodiments of the invention in relation to a tooth of a target.

FIGS. 3A-3C show an example embodiment of magnetic field sensing elements 302a-d positioned with respect to a ring magnet 304 in a bridge configuration. FIG. 4 shows an example sensor positioned in relation to a rotating target 102 having teeth 106 and valleys 108 on an outer surface. In the illustrated embodiment, each of the magnetic field sensing elements 302 are located on a circle aligned with the ring magnet 304. In one particular embodiment, first, second, third, and fourth magnetic field sensing elements 302a-d are provided as vertical Hall elements separated by ninety degrees on the circle and the Hall elements are located on a plane parallel to a face of the ring magnet. In embodiments, the magnetic field sensing elements 302 are positioned over a zero-gauss magnet to measure the deflected field, on the plane of the magnetic field sensing elements, generated by a rotating target.

Each sensing element field is subtracted with the diametrically opposite sensing element field, which has same magnitude but opposite field direction, creating a differential sensing. An external field is therefore cancelled out. Combining, such as by performing a sum or an average of each set of opposite differential sensing elements, allows measuring the magnetic deflection in multiple directions so as to render the IC orientation insensitive.

The magnetic field sensing elements 302a-d, which can include vertical Hall sensing elements, generate respective first, second, third, and fourth voltages Va, Vb, Vc, Vd from the resulting magnetic field due to the back bias magnet and the rotating target 102 in front. The first and second voltages Va, Vb correspond to a positive field along Zg axis and the third and fourth voltages Vc, Vd correspond to a positive field along Xg axis. The magnet is magnetized along Yg axis.

In embodiments, the vertical Hall plates/elements 302a-d are placed at a specific position relative to the magnet 304, such that the magnetic field sensed by the Hall plates is small when no target is in front of the sensor.

In the illustrated embodiment, the following channels are created from the voltage signals Va, Vb, Vc, Vd generated by the first, second, third and fourth magnetic field sensing elements.

Channel 1=Vd−Vc
Channel 2=Va−Vb
Channel sum=Channel 1+Channel 2.

FIGS. 5A-5F and FIGS. 6A-6F show simulations for Channel 1, Channel 2, and Channel Sum for an example configuration including a SmCo magnet of OD=6, ID=2, H=3 mm, where OD refers to outer diameter, ID refers to inner diameter, and H refers to height.

Figures 5A, 5B, 5C:
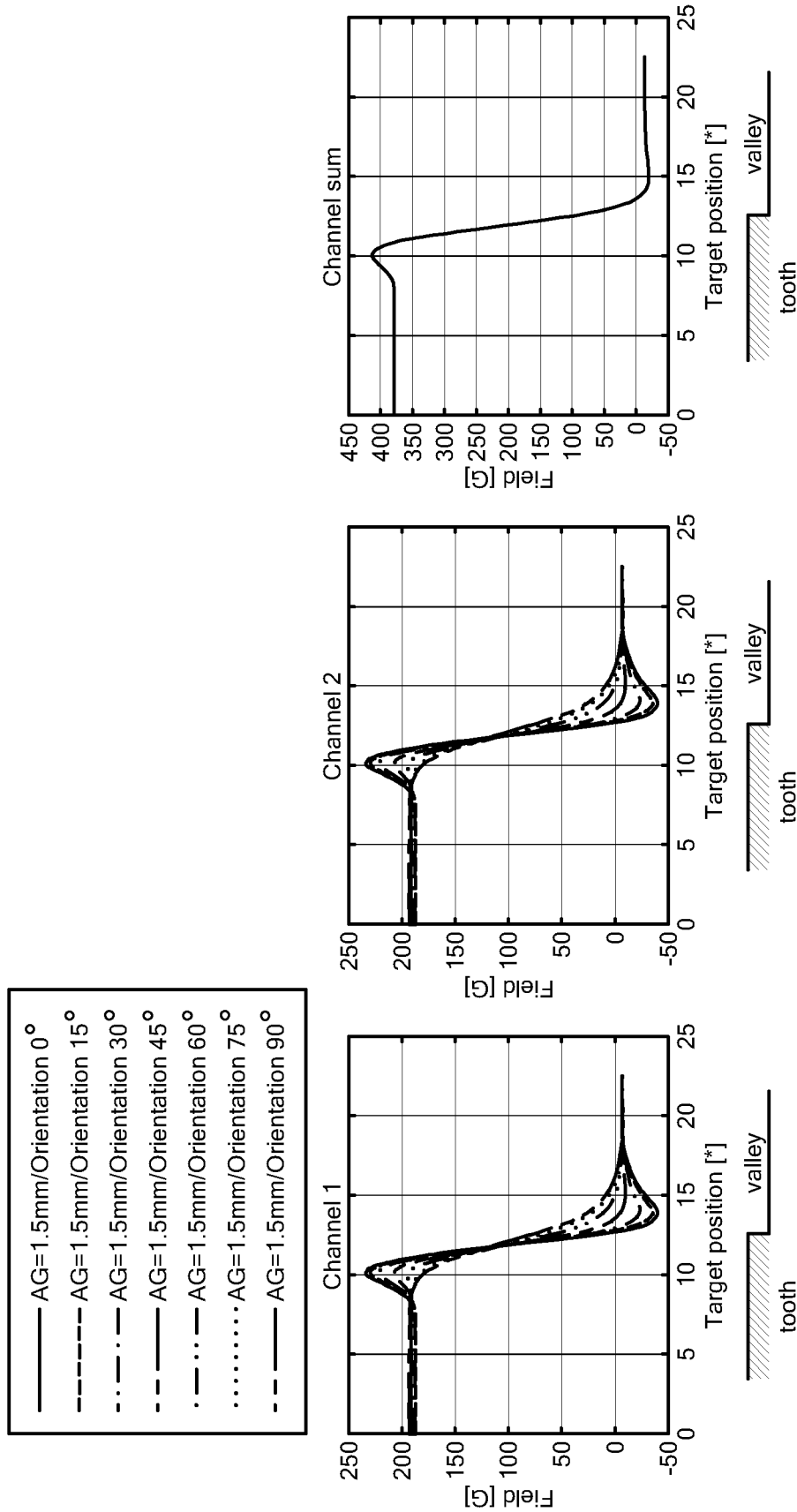
FIGS. 5A-C show a channel 1 signal, a channel 2 signal and a channel sum signal, respectively, for a constant airgap and varying orientation for an example magnetic field sensor IC and target in accordance with example embodiments of the invention.

FIGS. 5A-F show signals for a constant airgap of 1.5 mm and IC orientations from 0 degrees to 90 degrees at 15 degree intervals (0, 15, 30, 45, 60, 75, 90) versus target position. FIG. 5A shows the Channel 1 signal, FIG. 5B shows the Channel 2 signal, and FIG. 5C shows the Channel Sum signal. An example tooth/valley position is shown at the bottom of the figures.

Figures 5D, 5E, 5F:
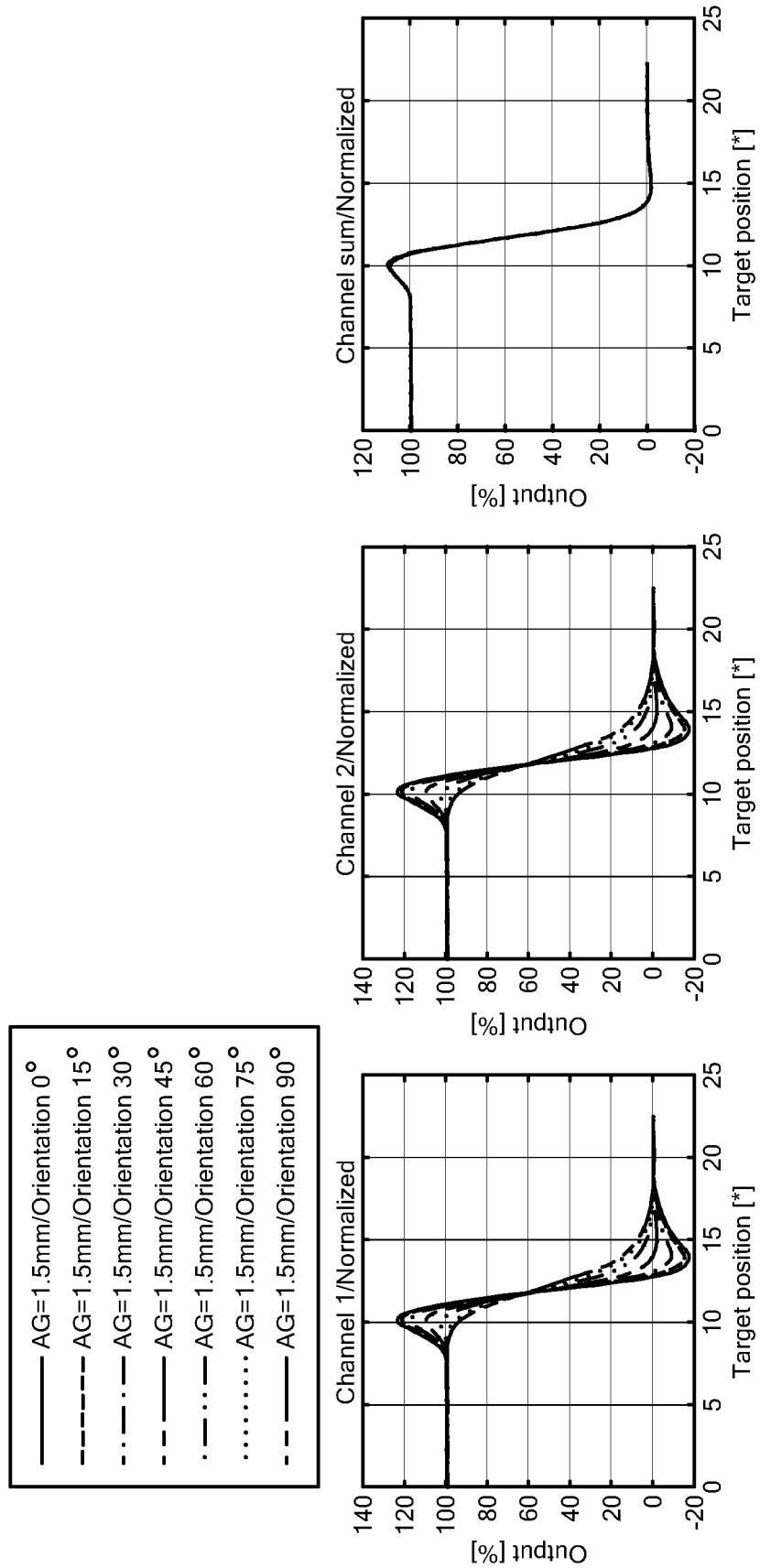
FIGS. 5D-F show normalized versions of the channel 1 signal, a channel 2 signal and a channel sum signal of FIGS. 5A-C.

FIG. 5D shows the Channel 1 signals of FIG. 5A normalized to range from 0 to 100 and similarly for FIGS. 5E and 5F normalized Channel 2 and Channel Sum.

Figures 6A, 6B, 6C:
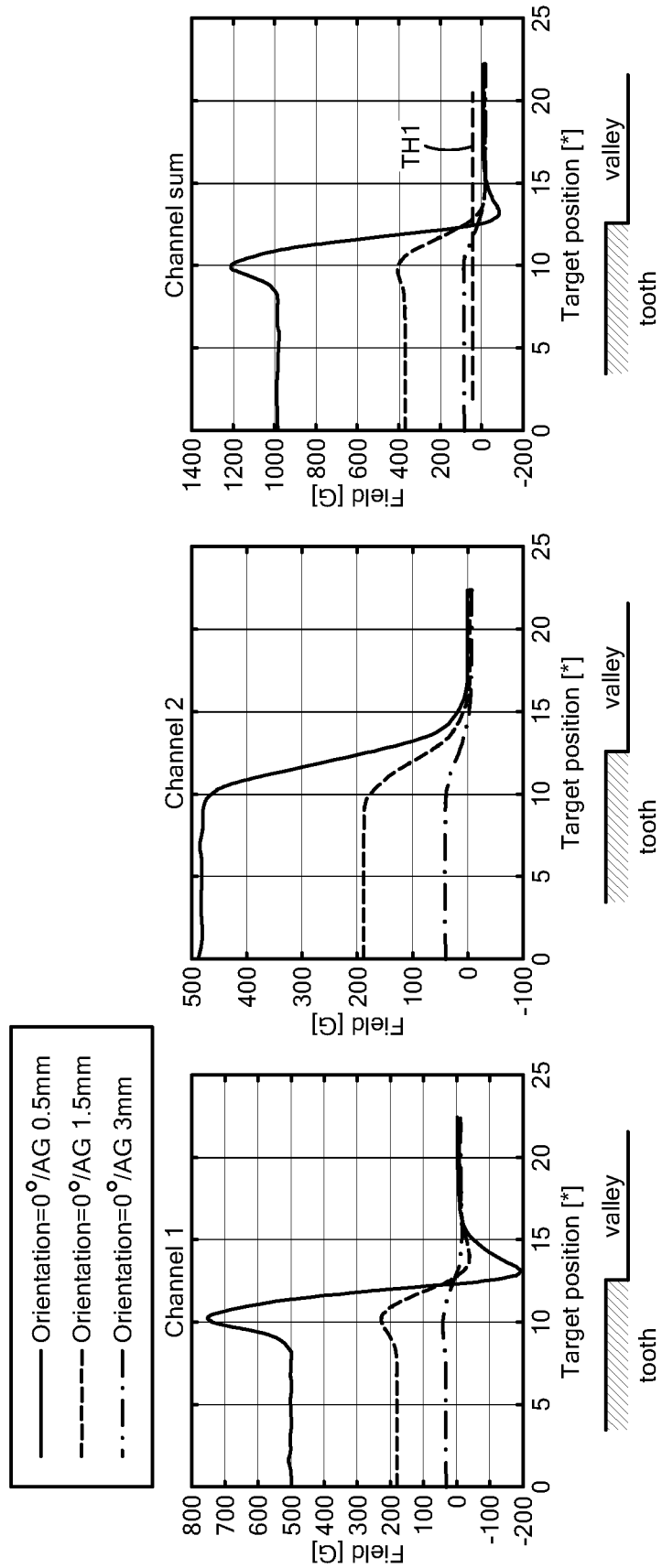
FIGS. 6A-C show a channel 1 signal, a channel 2 signal and a channel sum signal, respectively, for a varying airgap and constant orientation for an example magnetic field sensor IC and target in accordance with example embodiments of the invention.
Figures 6D, 6E, 6F:
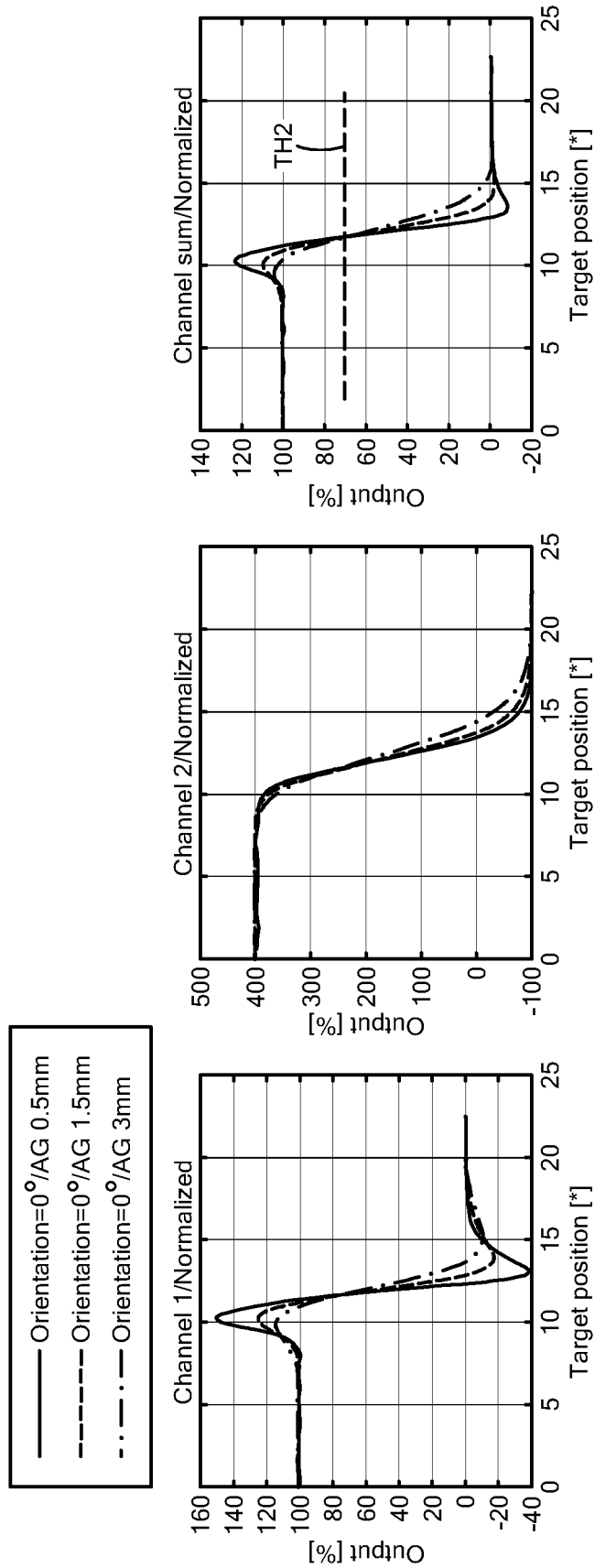
FIGS. 6D-F show normalized versions of the channel 1 signal, a channel 2 signal and a channel sum signal of FIGS. 6A-C.

FIGS. 6A-6C show channels signals for a constant orientation of 0 degrees and airgaps of 0.5 mm, 1.5 mm, and 3 mm versus target position for the same tooth/valley position as FIGS. 5A-5C. As can be seen, the field strength varies according to the air gap distance. FIG. 6A shows the signals for Channel 1, FIG. 6B shows the signals for Channel 2, and FIG. 6C shows the signals for Channel Sum. FIGS. 6D-6F shows the normalized signals for FIGS. 6A-6C, respectively.

It can be seen from FIGS. 5A-5F that the channel sum signal profiles are the same for the various orientations. That is, the sensor can have any orientation about the Yg axis in the Xg/Zg plane and generate the same Channel Sum signal. The sensor is 'twist' insensitive for a constant airgap. The plane of the sensing elements is ideally parallel to the tangent of the target to avoid errors and enhance twist insensitivity of the sensor.

From FIGS. 6A-6F (fixed orientation and various air gaps), it can be seen that the magnetic profile on the target valley is the same independent of the airgap. The signal amplitude on the tooth/valley transition changes as a function of the airgap. The separation between valley and tooth is well defined for uses in determining TPOS (True Power On State). A first threshold TH1 is used to discriminate the angular position at power on (sensor on a valley or a tooth). The first threshold TH1 should be located between the maximum signal of the valley and the minimum signal of the tooth. In embodiments, the first threshold TH1 is used only at start-up and has a fixed value (not a percentage), for example a voltage or equivalent magnetic field value.

An example second threshold TH2 at about 70% of output is shown in FIG. 6F for the normalized Channel Sum, which corresponds to the target profile. This threshold is used once start-up is complete. In the illustrated embodiment, 70% is selected because it is the crossing points of the curves over air gap. It makes the switching position independent of the air gap value.

While example embodiments are shown and described in conjunction with vertical Hall elements, it is understood that the magnetic field sensing elements can comprise any suitable element that can sense the magnetic field in the XgZg plane. The magnetic field sensing elements should measure the deflected field from the center of the magnet as the field is modulated by the moving target, such as varying airgap due to the teeth/valleys.

In embodiments the number of magnetic field sensing elements is at least four. In embodiments, an even number of magnetic field sensing elements is used. In embodiments, the magnetic field sensing elements are located on a circle. In embodiments, pairs of magnetic field sensing elements are located diametrically opposite to each other on the circle so as to sense in the same direction. In embodiments, each magnetic field sensing elements sense the radial field at its position on the circle. In embodiments, there is a constant distance between each successive magnetic field sensing element along the circle perimeter. That is, the magnetic field sensing elements are equally spaced apart on the circle.

Figure 7:
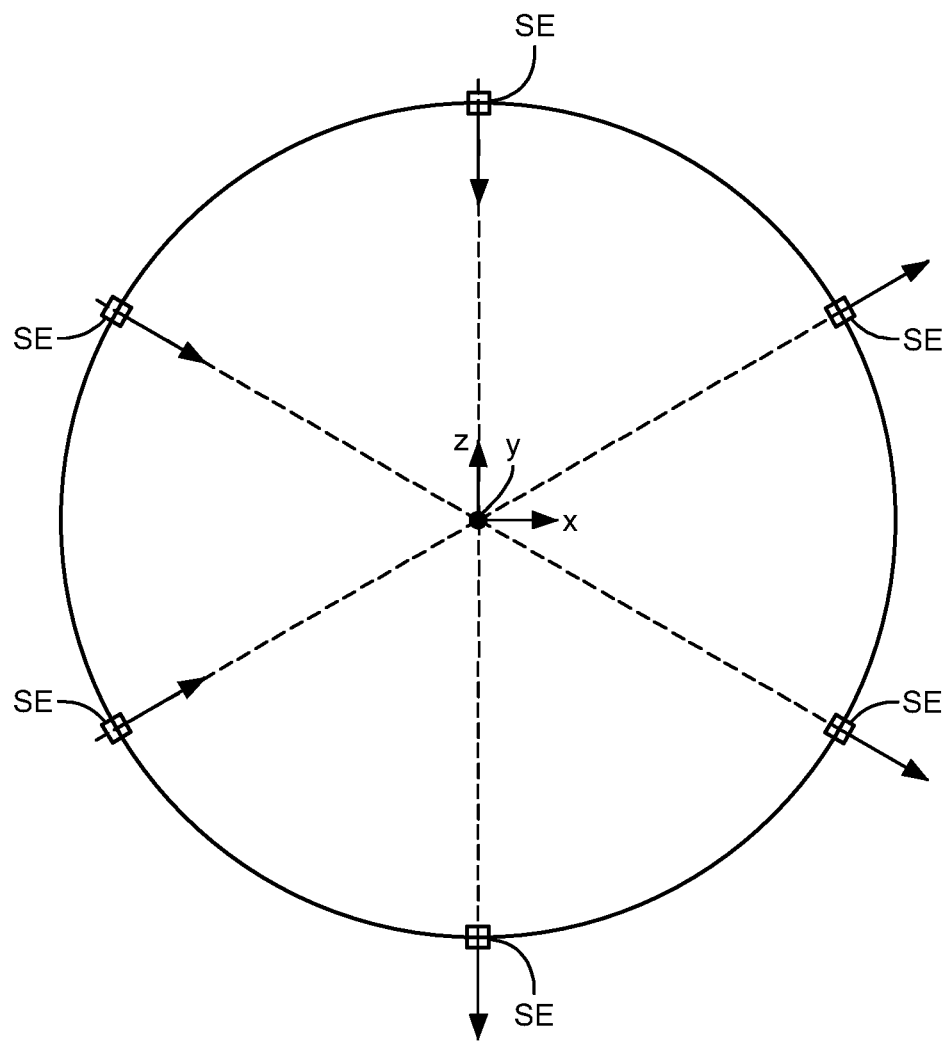
FIG. 7 is a representation of six magnetic field sensing elements equally located around a circle as part of an example magnetic field sensor IC and target in accordance with example embodiments of the invention.

FIG. 7 shows an example sensor having six magnetic field sensing elements SE equally spaced on a circle in the XZ plane. The Y axis comes out of the XZ plane. The positive sensing direction of each magnetic field sensing element is indicated by a respective arrow.

In an example embodiment having TPO functionality, a 0G magnet is used in conjunction with a selected radius of the sensing element circle so that the magnetic field generated by the magnet is close to zero at the sensing element positions. Having the field seen by the sensing elements be close to zero without a target in front increases insensitivity to thermal drift and enables more flexibility and control over selection of the TPO threshold.

While example embodiments show a sum of channel signals for pairs of magnetic field sensing elements, it is understood that signals from pairs or sets, or any practical number of magnetic field sensing elements, can be combined in any suitable way to provide a differential signal to reduce the effects of stray fields.

Assume that Bi,1 and Bi,2 are the magnetic fields measured by the pair i of opposite sensing elements and that there are n pairs of sensing elements. In one embodiment, the output signal is the sum of the differential signals:

$$B = \sum_{i=1}^{n} (B_{i,1} - B_{i,2})$$

In another embodiment, the output signal is the average of the differential signals:

$$B = \frac{\sum_{i=1}^{n} (B_{i,1} - B_{i,2})}{n}$$

It will be appreciated that taking the differential field of each pairs of sensing elements reduces the sensitivity of the sensor to external stray fields.

Figure 8:
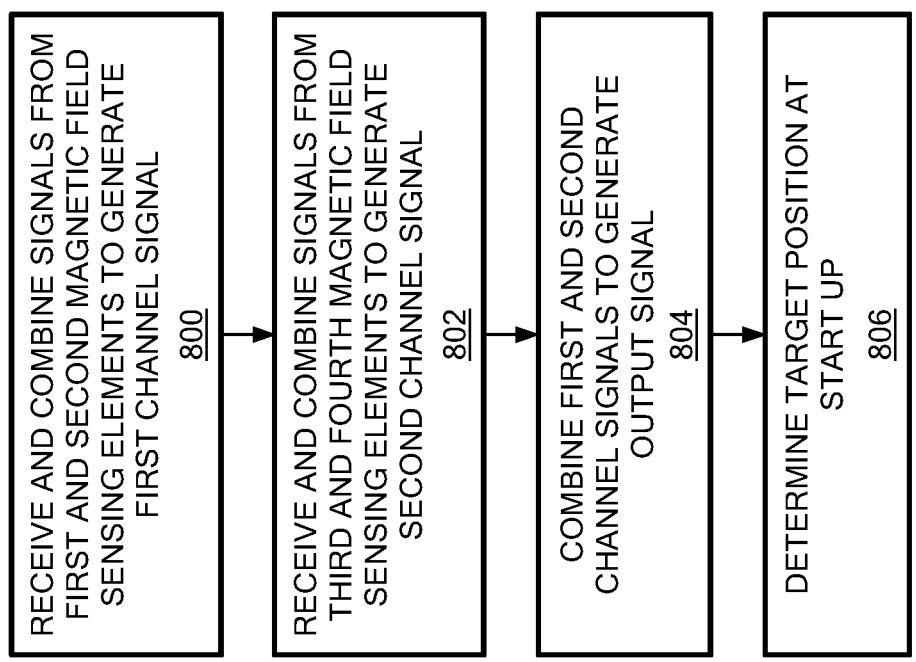
FIG. 8 is a flow diagram showing an example sequence of steps for processing for a magnetic field sensor IC in accordance with example embodiments of the invention.

FIG. 8 shows an example sequence of steps for providing orientation insensitive differential speed sensing in accordance with example embodiments of the invention. In step 800, first signals from first and second magnetic field sensing elements are received and combined to generate a first channel signal. In example embodiments, the first and second magnetic field sensing elements are located in a first plane and measure magnetic field change in response to a movement of a target. The first and second magnetic field sensing elements can be fixed in position in relation to each other. In step, 802, second signals from third and fourth magnetic field sensing elements are received and combined to generate a second channel signal. The third and fourth magnetic field sensing elements can be located in a second plane and measure magnetic field change in response to the movement of the target. In embodiments, the first, second, third, and fourth magnetic field sensing elements are back-biased, such as by a ring magnet. In step 804, the first channel signal and the second channel signal are combined to generate an output signal corresponding to the movement of the target. In example embodiments, the first and second channel signals are summed. In optional step 806, one or more magnetic field signals from the sensing elements are compared to a threshold to determine a position of the target during or after startup.

As used herein, the term "magnetic field sensing element" is used to describe a variety of electronic elements that can sense a magnetic field. The magnetic field sensing element can be, but is not limited to, a Hall effect element, a fluxgate, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

Some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the term "accuracy," when referring to a magnetic field sensor, is used to refer to a variety of aspects of the magnetic field sensor. These aspects include, but are not limited to, an ability of the magnetic field sensor to differentiate: a gear tooth from a gear valley (or, more generally, the presence of a ferromagnetic object from the absence of a ferromagnetic object) when the gear is not rotating and/or when the gear is rotating (or, more generally, when a ferromagnetic object is moving or not moving), an ability to differentiate an edge of a tooth of the gear from the tooth or the valley of the gear (or, more generally, the edge of a ferromagnetic object or a change in magnetization direction of a hard ferromagnetic object), and a rotational accuracy with which the edge of the gear tooth is identified (or, more generally, the positional accuracy with which an edge of a ferromagnetic object or hard ferromagnetic object can be identified). Ultimately, accuracy refers to output signal edge placement accuracy and consistency with respect to gear tooth edges passing by the magnetic field sensor.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/−ten degrees.

It is desirable for magnetic field sensors to achieve a certain level or amount of accuracy even in the presence of variations in an air gap between the magnetic field sensor and the gear that may change from installation to installation or from time to time. It is also desirable for magnetic field sensors to achieve accuracy even in the presence of variations in relative positions of the magnet and the magnetic field sensing element within the magnetic field sensor. It is also desirable for magnetic field sensors to achieve accuracy even in the presence of unit-to-unit variations in the magnetic field generated by a magnet within the magnetic field sensors. It is also desirable for magnetic field sensors to achieve accuracy even in the presence of variations of an axial rotation of the magnetic field sensors relative to the gear. It is also desirable for magnetic field sensors to achieve accuracy even in the presence of temperature variations of the magnetic field sensors.

Examples herein may describe a particular target, such as engine camshaft ferromagnetic target. However, similar circuits and techniques can be used with other cams or gears or ring magnets disposed upon the engine camshaft, or upon other rotating parts of an engine (e.g., crank shaft, transmission gear, anti-lock braking system (ABS), or upon rotating parts of a device that is not an engine. Other applications may include linear translation sensors or other sensors where the target is not a rotating gear.

The gear can have ferromagnetic gear teeth, which are generally soft ferromagnetic objects, but which can also be hard ferromagnetic objects, patterns, or domains which may or may not have actual physical changes in their shape. Also, while examples are shown below of magnetic field sensors that can sense ferromagnetic gear teeth or gear teeth edges upon a gear configured to rotate, the magnetic field sensors can be used in other applications. The other applications include, but are not limited to, sensing ferromagnetic objects upon a structure configured to move linearly.

Example magnetic field sensors can have a variety of features that may be described in one or more of the following patents or patent publications: U.S. Pat. Nos. 6,525,531, 6,278,269, 5,781,005, 7,777,607, 8,450,996, 7,772,838, 7,253,614, 7,026,808, 8,624,588, 7,368,904, 6,693,419, 8,729,892, 5,917,320, 6,091,239, 2012/0249126, all of which are herein incorporated herein by reference.

Figure 9:
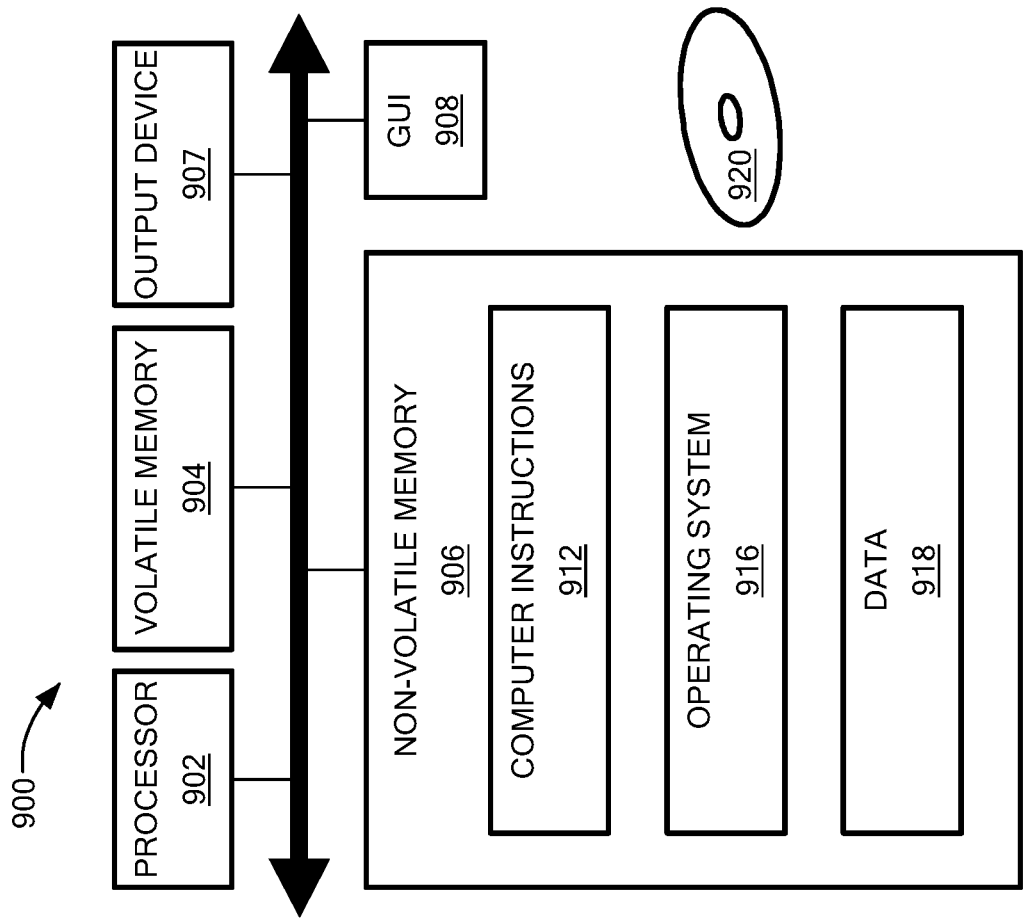
FIG. 9 is a schematic representation of an example computer that can perform at least a portion of the processing described herein.

FIG. 9 shows an exemplary computer 900 that can perform at least part of the processing described herein. The computer 900 includes a processor 902, a volatile memory 904, a non-volatile memory 906 (e.g., hard disk), an output device 907 and a graphical user interface (GUI) 908 (e.g., a mouse, a keyboard, a display, for example). The non-volatile memory 906 stores computer instructions 912, an operating system 916 and data 918. In one example, the computer instructions 912 are executed by the processor 902 out of volatile memory 904. In one embodiment, an article 920 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A sensor, comprising:
   at least a first pair of sensing elements comprising first and second magnetic field sensing elements and a second pair of sensing elements comprising third and fourth magnetic field sensing elements for measuring field change in response to movement of a target, wherein the magnetic field sensing elements in the first and second pairs of sensing elements are arranged on a circumference of a planar circle, wherein each of the magnetic field sensing elements has its most sensitive direction to a magnetic field radial to the planar circle, wherein the first magnetic field sensing element is positioned to be diametrically opposite the second magnetic field sensing element, and wherein the third magnetic field sensing element is positioned to be diametrically opposite the fourth magnetic field sensing element, wherein the first and second magnetic field sensing elements are configured to measure positive field in the same direction and the third and fourth magnetic field sensing elements are configured to measure positive field in the same direction, wherein a plane of the planar circle is configured for positioning to be parallel to a tangent of the target which has teeth and valleys, wherein the sensor is configured to subtract a voltage generated by the second magnetic field sensing element from a voltage generated by the first magnetic field sensing element to provide a first voltage, and wherein the sensor is configured to subtract a voltage generated by the third magnetic field sensing element from a voltage generated by the fourth magnetic field sensing element to generate a second voltage, and wherein the sensor is configured to combine the first and second voltages to generate a third voltage.

2. The sensor according to claim 1, wherein the first, second, third, and fourth magnetic field sensing elements comprise vertical Hall elements.

3. The sensor according to claim 1, wherein the first, second, third, and fourth magnetic field sensing elements comprise magnetoresistive elements.

4. The sensor according to claim 1, further including combining the first voltage and the second voltage by averaging the first channel signal and the second channel signal.

5. The sensor according to claim 1, further including combining the first voltage and the second voltage by summing the first channel signal and the second channel signal.

6. The sensor according to claim 1, wherein the first, second, third, and fourth magnetic field sensing elements are back-biased by a ring magnet or a block magnet.

7. The sensor according to claim 1, wherein the first, second, third, and fourth magnetic field sensing elements are back-biased by a 0G magnet.

8. The sensor according to claim 1, wherein the wherein the first, second, third, and fourth magnetic field sensing elements are positioned so that a magnetic field sensed for a maximum distance from the target is less than a magnetic field sensed for a minimum distance from the target.

9. The sensor according to claim 1, further including setting a threshold on the third voltage to determine a position of the target during start up.

10. The sensor according to claim 9, wherein the threshold is between the third voltage corresponding to a tooth of the target proximate the first, second, third, and fourth magnetic field sensing elements and a valley of the target proximate the first, second, third, and fourth magnetic field sensing elements.

11. The sensor according to claim 1, wherein the first, second, third, and fourth magnetic field sensing elements are equally spaced about the circle.

12. The sensor according to claim 1, wherein the first, second, third, and fourth magnetic field sensing elements are arranged in a bridge configuration.

13. The sensor according to claim 1, further including at least two more magnetic field sensing elements in addition to the first, second, third, and fourth magnetic field sensing elements.

14. A method, comprising:
employing at least a first pair of sensing elements comprising first and second magnetic field sensing elements and a second pair of sensing elements comprising third and fourth magnetic field sensing elements for measuring field change in response to movement of a target, wherein the magnetic field sensing elements in the first and second pairs of sensing elements are arranged on a circumference of in a planar circle, wherein each of the magnetic field sensing elements has its most sensitive direction to a magnetic field radial to the planar circle, wherein the first magnetic field sensing element is positioned to be diametrically opposite the second magnetic field sensing element, and wherein the third magnetic field sensing element is positioned to be diametrically opposite the fourth magnetic field sensing element, wherein the first and second magnetic field sensing elements are configured to measure positive field in the same direction and the third and fourth magnetic field sensing elements are configured to measure positive field in the same direction, wherein a plane of the planar circle is configured for positioning to be parallel to a tangent of the target which has teeth and valleys;
subtracting a voltage generated by the second magnetic field sensing element from a voltage generated by the first magnetic field sensing element to provide a first voltage;
subtracting a voltage generated by the third magnetic field sensing element from a voltage generated by the fourth magnetic field sensing element to generate a second voltage; and
combining the first and second voltages to generate a third voltage.

15. The method according to claim 14, wherein the first, second, third, and fourth magnetic field sensing elements comprise vertical Hall elements.

16. The method according to claim 14, wherein the first, second, third, and fourth magnetic field sensing elements comprise magnetoresistive elements.

17. The method according to claim 14, further including combining the first voltage and the second voltage by averaging the first channel signal and the second channel signal.

18. The method according to claim 14, further including combining the first voltage and the second voltage by summing the first channel signal and the second channel signal.

19. The method according to claim 14, wherein the first, second, third, and fourth magnetic field sensing elements are back-biased by a ring magnet or a block magnet.

20. The method according to claim 14, wherein the first, second, third, and fourth magnetic field sensing elements are back-biased by a 0G magnet.

21. The method according to claim 14, wherein the wherein the first, second, third, and fourth magnetic field sensing elements are positioned so that a magnetic field sensed for a maximum distance from the target is less than a magnetic field sensed for a minimum distance from the target.

22. The method according to claim 14, further including setting a threshold on the third voltage to determine a position of the target during start up.

23. The sensor according to claim 22, wherein the threshold is between the third voltage corresponding to a tooth of the target proximate the first, second, third, and fourth magnetic field sensing elements and a valley of the target proximate the first, second, third, and fourth magnetic field sensing elements.

24. The method according to claim 14, wherein the first, second, third, and fourth magnetic field sensing elements are equally spaced about the circle.

25. The method according to claim 14, wherein the first, second, third, and fourth magnetic field sensing elements and configured are arranged in a bridge configuration.

26. The method according to claim 14, further including employing at least two more magnetic field sensing elements in addition to the first, second, third, and fourth magnetic field sensing elements.

27. A sensor, comprising:

a means for sensing comprising a plurality of magnetic field sensing elements for measuring field change in response to movement of a target, wherein the magnetic field sensing elements are arranged on a circumference of a planar circle, and each of the magnetic field sensing elements is positioned to be diametrically opposite another of the magnetic field sensing elements, wherein a plane of the planar circle is configured for positioning to be parallel to a tangent of the target which has teeth and valleys; and a means for subtracting a voltage generated by a second one of the magnetic field sensing element from a voltage generated by a first one of the magnetic field sensing elements to provide a first voltage, subtracting a voltage generated by a third one of the magnetic field sensing elements from a voltage generated by a fourth one of the magnetic field sensing elements to generate a second voltage, and combining the first and second voltages to generate a third voltage.

28. The sensor according to claim 27, wherein the first, second, third, and fourth ones of the magnetic field sensing elements comprise vertical Hall elements.

29. The sensor according to claim 27, wherein the first, second, third, and fourth ones of the magnetic field sensing elements comprise magnetoresistive elements.

30. The sensor according to claim 27, further including combining the first voltage and the second voltage by averaging the first channel signal and the second channel signal.

31. The sensor according to claim 27, further including combining the first voltage and the second voltage by summing the first channel signal and the second channel signal.

32. The sensor according to claim 27, wherein the first, second, third, and fourth ones of the magnetic field sensing elements are back-biased by a ring magnet or a block magnet.

33. The sensor according to claim 27, wherein the first, second, third, and fourth ones of the magnetic field sensing elements are back-biased by a 0G magnet.

34. The sensor according to claim 27, wherein the wherein the first, second, third, and fourth ones of the magnetic field sensing elements are positioned so that a magnetic field sensed for a maximum distance from the target is less than a magnetic field sensed for a minimum distance from the target.

35. The sensor according to claim 27, further including setting a threshold for magnetic field strength sensed by the first, second, third, and/or fourth ones of the magnetic field sensing elements to determine a position of the target during start up.

36. The sensor according to claim 35, wherein the threshold is between the magnetic field strength corresponding to a tooth of the target proximate the first, second, third, and fourth ones of the magnetic field sensing elements and a valley of the target proximate the first, second, third, and fourth ones of the magnetic field sensing elements.

37. The sensor according to claim 27, wherein the first, second, third, and fourth ones of the magnetic field sensing elements are equally spaced about the circle.

* * * * *